United States Patent [19]

Enderle

[11] Patent Number: 5,148,673
[45] Date of Patent: Sep. 22, 1992

[54] INTEGRATED TURBORAMJET ENGINE

[75] Inventor: Heinrich Enderle, Groebenzell, Fed. Rep. of Germany

[73] Assignee: MTU Motoren- und Turbinen-Union Munchen GmbH, Fed. Rep. of Germany

[21] Appl. No.: 602,761

[22] Filed: Oct. 24, 1990

[30] Foreign Application Priority Data

Oct. 24, 1989 [DE] Fed. Rep. of Germany ...... 3935313

[51] Int. Cl.$^5$ ............................................. F02K 7/16
[52] U.S. Cl. ........................................ 60/225; 60/244; 137/15.1
[58] Field of Search .............. 60/224, 225, 244, 245; 137/15.1, 15.2

[56] References Cited

U.S. PATENT DOCUMENTS

| 3,153,904 | 10/1964 | Ellis et al. | 60/244 |
| 3,176,462 | 4/1965 | Eckert | 60/244 |
| 3,296,800 | 1/1967 | Keenan et al. | 60/244 |
| 5,058,378 | 10/1991 | Enderle | 60/225 |

FOREIGN PATENT DOCUMENTS

| 392520 | 10/1990 | European Pat. Off. | 60/225 |
| 3236487 | 4/1984 | Fed. Rep. of Germany . | |
| 3738703 | 12/1988 | Fed. Rep. of Germany . | |

Primary Examiner—Louis J. Casaregola
Attorney, Agent, or Firm—Evenson, Wands, Edwards, Lenahan & McKeown

[57] ABSTRACT

An integrated turboramjet engine has an axially slidable inlet cone, a rigid guide ring arranged concentrically outside the inlet cone, and a lock ring which can be slid axially against the inlet cone, whereby the air volume flowing into the air inlet can be introduced alternately into a turbo-inlet duct or a ram-air inlet duct in a low-loss and flow-promoting manner.

25 Claims, 2 Drawing Sheets

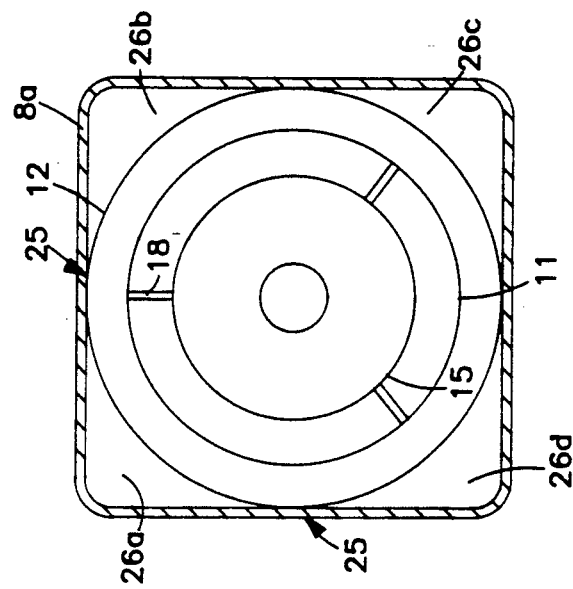
FIG. 5
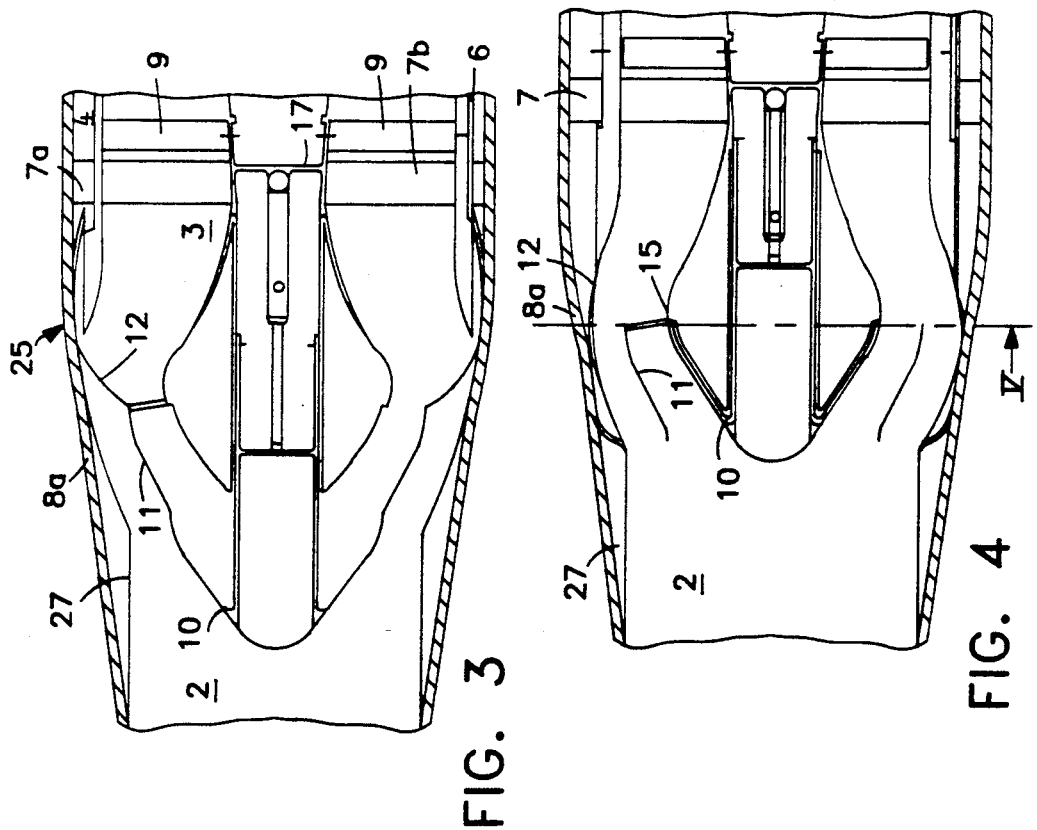
FIG. 3
FIG. 4

INTEGRATED TURBORAMJET ENGINE

BACKGROUND OF THE INVENTION

The invention relates to an integrated turboramjet engine having a common air inlet for the turbo and the ramjet circuit, having an annular turbo-inlet duct and a ram-air inlet duct which surrounds it concentrically.

Endeavors are taking place to develop hypersonic airplanes which can take off and land on normal airfields and develop cruising speeds of several Mach. Hypersonic airplanes of this type may be used either as fast long-distance transport planes or as normally starting space tugs. The achievable Mach numbers range between Mach 4 and 8 at flight altitudes of approximately 30 km.

Engines for the propulsion of such airplanes must meet a number of requirements which cannot be met by means of conventional engine concepts. Thus, on the one hand, a sufficient power output must take place at low flying speeds of below Mach 1 up to the top speeds. For this purpose, it has been suggested to provide combined turboramjet engines which, at low flying speeds, operate as gas turbine jet engines with or without an afterburner and, above a certain flying speed, operate as ramjet engines (RAM operation).

An embodiment of such engines provides that a gas turbine engine is provided on both sides with flaps that can be shut, an afterburner flow starting from the gas turbine, at the same time, being used as the ramjet combustion chamber. For this purpose, an annular ram air duct is provided concentrically outside the gas turbine through which the inflowing air, during the ramjet operation, is guided directly into the combustion chamber while bypassing the gas turbine. For this purpose, movable guide plates are provided in the area of the inlet duct and behind the turbine which selectively guide the air flow either in the concentrically interior turbo-inlet duct and thus through the gas turbine core engine, or into the concentrically exterior ram-air inlet duct.

It is a serious problem in the case of such change-over engines that the outer diameter of the engine must be kept as small as possible in order to, on the one hand, keep the flow resistances caused by the airplane as low as possible and, on the other hand, in the case of a suggested mounting of a row of approximately 5 engines next to one another, achieve an overall width that is as small as possible. The minimum extent of the outside diameter of the engine is determined by the cross-sections of the two inlet ducts as well as the inside diameter required in the hub area for the core engine.

Based on the above, it is an object of the present invention to construct a turboramjet engine such that a deflection of the air current is possible into one of the two inlet ducts, in which case the minimum outside diameter of the engine given by the aerodynamic and constructive parameters must be exceeded as little as possible.

According to the invention, this object is achieved by an integrated turboramjet engine having a common air inlet for the turbo and for the ramjet circuit, having an annular turbo-inlet duct and a ram-air inlet duct which concentrically surrounds this turbo-inlet duct, and having a conical guide ring which is stationarily arranged in the air inlet and radially inside of which an inlet cone is provided and radially outside of which a lock ring is provided which can axially slide against the inlet cone, wherein said inlet cone and lock ring are selectively adjustable between a first ramjet operating position with the inlet cone situated in its front end position and the lock ring situated in its rear end position so that the inlet cone, guide ring and lock ring form a duct wall which guides the gas flow into the ramjet inlet duct and, a second ramjet operating position with the ram-air inlet duct being closed off by the lock ring and the gas flow being guided on both sides of the guide ring into the turbo-inlet duct.

It is a principal advantage of the invention that, while the minimum diameter defined by the inlet ducts is maintained, a deflection of the air current is possible into one of the two inlet ducts, in which case a low-loss wall contour of the flow ducts can be achieved at the same time. In addition, by means of this arrangement, also at the critical moment of the change-over from the turbo to the ramjet operation, the engine power can be maintained because of the fact that the arriving air can be deflected in a targeted and continuous manner from one inlet duct into the other inlet duct.

Advantageously, only two movable parts, specifically the inlet cone and the lock ring must be constructed to be movable with respect to one another by means of simple adjusting drives. These movable parts are constructed to be rotationally symmetrical and may therefore have an advantageous construction with respect to their weight. This type of a rotationally symmetrical construction is also suitable for the film cooling or convective cooling in the ramjet operation.

Another advantage is the fact that, in the ramjet operation, driving and guiding elements of the movable parts are housed in the closed-off turbo-part and are covered. The strokes of these parts may be kept short and approximately identical for both parts. As a result, a synchronization of the movements and an improvement of the change-over function can be achieved. It is also an advantage that the whole shut-off system takes up only a short length and requires a low weight.

Good sealing possibilities of the moving parts, that is the inlet cone and the lock ring, exist with respect to the stationary parts, that is, the outer wall and the guide ring. In addition, only low adjusting forces are required for the adjustment of these movable parts in all operating conditions and also in the case of high back pressures.

Finally, it is an advantage that the whole shut-off arrangement is constructed in a modular design and can therefore be integrated between the air inlet housing and the engine housing.

The contour of the stationary guide ring is preferably constructed such that the dividing of the approaching air takes place uniformly into the two concentric flow ducts radially inside and outside the guide ring and, in the process, a uniform acceleration of the flow is achieved with a uniform flow profile existing over the whole flow cross-section. As a result, a uniform inflow is achieved by way of a gooseneck-shaped flow duct with a corresponding acceleration in the direction of the compressor.

In an advantageous further development of certain preferred embodiments of the invention, the guide ring, by means of a number of radial supporting ribs, is supported on the interior housing of the engine. This arrangement has the advantage that no components are situated in the flow duct during the ramjet operation and the resulting high temperatures.

Another advantageous development of certain preferred embodiments of the invention provides that the exterior wall of the ram air inlet duct has a square cross-section in the moving range of the lock ring. This arrangement has the significant advantage that, during the ramjet operation, the corner areas of the square housing can also be used for the introduction of air into the ram air inlet duct, resulting in smaller outer dimensions of the engine. In comparison to a construction with a rotationally symmetrical outer wall, the circular duct radially outside the lock ring may advantageously be eliminated which means that the outer wall which has a square cross-section is pulled toward the inside until it reaches the lock ring.

A further development of this construction provides that the air inlet housing has a square construction and is deformed into a round cross-section in a transition area downstream of the rear end position of the lock ring, in which case an air-guiding shell is mounted upstream of the lock ring on the inside at the air inlet housing which, up to its contact line with the lock ring, has a transition from the square to the round cross-section, and in its further course, adapts itself again from a round shape to a square shape with respect to the air inlet housing. In connection with the lock ring, this results in a favorable flow contour from the air inlet to the compressor inlet (gooseneck) as well as to the ram air inlet duct. A significant advantage of this construction is achieved by the fact that, when several engines are arranged next to one another, the air inlets have a rectangular cross-section which up to now upstream of this change-over arrangement, had been changed to a round cross-section. By means of the solution according to the invention, it is therefore possible to retain this rectangular contour up to far toward the rear and utilize it at the same time for the change-over of the air flow.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic partial axial sectional view of a turboramjet engine shown in the ramjet operation, constructed in accordance with another preferred embodiment of the invention;

FIG. 4 is a schematic partial axial sectional view of the engine according to FIG. 3 shown in the turbo-operation; and FIG. 5 is a cross-sectional view of the engine taken along Line V in FIG. 4.

DETAILED DESCRIPTION OF THE DRAWINGS

Figure 1:
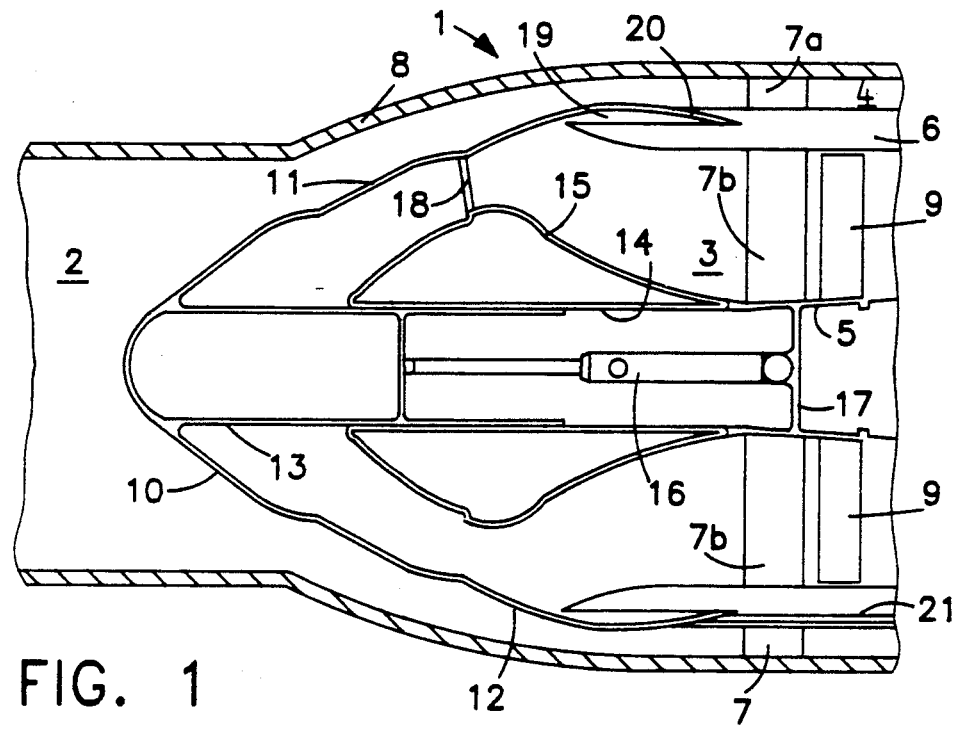
FIG. 1 is a schematic partial axial sectional view of a turboramjet engine shown in the ramjet operation, constructed according to a preferred embodiment of the invention.

The turboramjet engine shown in a partial axial sectional view in the ramjet operating position in FIG. 1 has a common air inlet 2 which is alternately connected with an annular turbo-inlet duct 3 or a ram-air inlet duct 4 which surrounds the turbo-inlet duct 3 concentrically.

On the interior side, the turbo-air inlet duct 3 is bounded by an interior housing 5 which is connected with a compressor of a gas turbine which is arranged downstream and is not shown. Between the turbo-air inlet duct 3 and the ram-air inlet duct 4, an intermediate housing 6 is provided which, by way of radially arranged supporting ribs 7a and 7b, connects the interior housing 5 with the outer housing 8 of the engine. In this case, the thrust forces generated in the engine are transmitted by way of these supporting ribs, to the airplane connected with the outer housing 8 of the engine. An adjustable row of guide blades 9 which can be swivelled by means of adjusting devices housed in the intermediate housing 6 is shown in order to suggest a compressor which is not shown in detail.

The arrangement according to the invention for deflecting the air volume approaching in the air inlet 2 alternately into the turbo-air inlet duct 3 or the ram-air inlet duct 4 essentially comprises the axially slidable inlet cone 10, the rigidly arranged guide ring 11 and the lock ring 12 which is axially slidable against the inlet cone.

The inlet cone 10 is connected with a guiding cylinder 13 which is slidably displaceably disposed in a correspondingly developed guide 14 of the enlargement-type front part 15 of the interior housing.

An adjusting arrangement 16 which preferably is constructed to be electrical, pneumatic or hydraulic, on the one side, is mounted on the guiding cylinder 13 of the inlet cone 10 and, on the other side, on a holding flange 17 of the interior housing 5, and thus permits an axial pushing-forward and pushing-backward of the inlet cone 10. The guiding cylinder 13 as well as the adjusting arrangement 16, in the shown ramjet operating position, are advantageously sealed off from the air flow so that the occurring high temperatures cannot affect them. The inlet cone 10 has such a contour that, in the ramjet operating position shown in FIG. 1, it rests sealingly with its outer circumference against the guide ring 11 and, on the other hand, in the turbo-operating position shown in FIG. 2, together with the front part 15 of the interior housing defines a gooseneck-shaped interior contour for the turbo-inlet duct 3.

The guide ring 11 is rigidly arranged in the turboramjet engine 1 which is achieved by the fact that it is connected with the front part 15 of the interior housing by way of a number of radial supporting ribs 18 distributed on the circumference.

The lock ring 12 is arranged radially outside the guide ring 11 and has a shape that is convex toward the exterior. In this case, this lock ring is constructed such that, on the one hand, its interior surface is designed for achieving a contour which promotes the flow as much as possible during the turbo-operation, in which case this lock ring 12 is in its axially front end position, and, on the other hand, during the ram air operation, its outer contour ensures a transition into the ram air duct 4 which promotes the flow just as much. This means that the lock ring 12, if required, is constructed in two layers in order to meet these two completely different flow requirements. In addition, the lock ring 12 is designed such that its front edge closes off with the rear edge of the guide ring 11 in a sealing and flow-promoting manner so that, in the ramjet operation shown in FIG. 1, a favorable flow contour is obtained from the inlet cone 10, by way of the guide ring 11 and the lock ring 12, into the ram-air inlet duct 4. For this purpose, the intermediate housing 6 has a guiding recess 19 in which the lock ring 12 is guided in an axially slidable manner. This guiding recess 19 is notched in its rear area in adaptation to the rear edge of the lock ring 12, the blade-type circumferential edge 20 sealingly resting against the lock ring 12. The lock ring 12 is axially slidable by wa of an adjusting arrangement 21, in which case it is possible to distribute several identical adjusting arrangements 21 on the circumference of the turboramjet engine 1.

The outer housing 8 of the engine, in the transition area from the air inlet 2 to the ram-air inlet duct 4, has a continuously narrowing contour in order to generate an accelerating flow.

Figure 2:
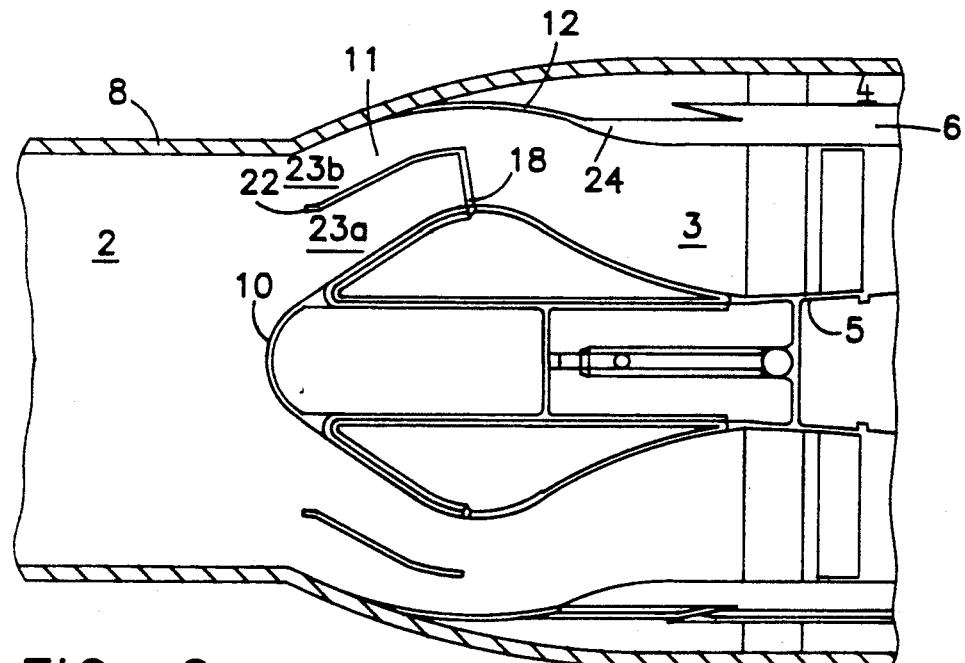
FIG. 2 is a view of the engine according to FIG. 1 shown in the turbo-operation.

The embodiment of the invention illustrated in FIG. 1 is shown in FIG. 2 in the turbo-operating position which differs from the ramjet operating position shown in FIG. 1 because of the fact that the inlet cone 10 has moved into its rear end position, while, at the same time, the lock ring 12 has slid into its front end position. As a result, the air volume approaching in the air inlet 2 is completely guided into the turbo-air inlet duct 3 while the ram-air inlet duct 4 is closed at the same time.

The contours of the inlet cone 10, of the guide ring 11 and of the lock ring 12 in this case are adapted with respect to one another such that, by means of the front edge 22 of the guide ring 11, the volume flow in divided into two concentric flow ducts 23a, b radially inside and outside the guide ring 11. In this case, the relationships of the inlet cross-sections of these two flow ducts 23a, b are identical to the relationship of the outlet cross-sections in the area of the supporting ribs 18 in order to achieve a flow around the guide ring 11 that is as low in losses as possible. In this case, it is expedient to provide the guide ring 11 with an aerodynamic profile contour having front and rear edges which promote the flow in order to avoid burbling along the profile. In addition, as a result, the boundary layer influences along the profile are to be reduced, and smaller afterrunning indentations are to be achieved with low losses at the rear edge of the guide ring 11 which result in a reduction of the flow losses at the compressor inlet.

The front edge 24 of the intermediate housing 6, in adaptation to the bend of the lock ring 12, is also designed in such a manner in order to permit an outer contour of the outer housing 8 of the engine that promotes the flow as well as possible by way of the lock ring 12 into the turbo-air inlet duct 3.

An alternative embodiment of the invention is illustrated in FIGS. 3 to 5. It differs from the embodiment shown in FIGS. 1 and 2 because of the fact that the outer housing 8a of the engine—as demonstrated in FIG. 5—has a square cross-section. In contrast, the other components, particularly the inlet cone 10, the guide ring 12 and the intermediate housing 6 continue to have a round design. The important difference with respect to the above-illustrated embodiment is that, in the ramjet operating position shown in FIG. 3, the air current flows from the air inlet 2 into the ram-air inlet duct 4 no longer by way of a rotationally symmetrical flow duct, but that the flow, from a rotationally symmetrical inflow at the level of the inlet cone 10, is divided into four partial flows which are approximately triangular in their cross-section, at the level of the contact points 25 between the lock ring 12 and the outer housing 8 of the engine.

In FIG. 4, this embodiment of the invention is shown in the turbo-operating position, the inlet cone 10 being situated in its rear end position analogous to the embodiment shown in FIG. 2, whereas the lock ring 12, while shutting the ram-air inlet duct 4, is situated in its front end position. Thus the air volume 2 approaching in the air inlet 2, while being divided by the guide ring 11, is guided into the turbo-air inlet duct 3 with low losses. Since the front edge of the lock ring 12 has a round cross-section, it is required for achieving a flow-promoting contour, to adapt the outer wall of the air inlet 2 in the turbo-operation to this round contour. For this purpose, an air guiding shell 27 is mounted on the outer housing 8a of the engine and deforms itself from its upstream end, from a rectangular or square cross-section to a circular cross-section and is adapted to the contour of the front part of the lock ring. In a further down-stream course, the cross-section of the air guiding shell 27 changes again from round to square and adapts itself to the contour of the outer housing 8 of the engine.

FIG. 5 represents a schematic sectional view approximately at the level of line V according to FIG. 4, where the four approximately triangular flow cross-sections 26a, b, c, d, can be recognized. Downstream of the contact point 25, the outer housing 8a of the engine changes from the square cross-section to approximately the level of the supporting ribs 7 to a round cross-section so that the ram-air inlet duct 4, downstream of these supporting ribs 7, is constructed to be rotationally symmetrical. The contact points 25 between the square outer housing 8a of the engine and the round lock ring 12 are also shown. In this case, the term "contact point" must not be taken literally because it is important that as little air as possible exists at these points. A direct contact of both elements 12 and 8a is not expedient.

Three supporting ribs 18 are shown which are distributed on the circumference and have the purpose of fixing the guide ring 11 on the front part 15 of the interior housing.

It is an important advantage of embodiments 3 to 5, in which the outer housing 8a of the engine has a square cross-section, that, in the case of an approximately identically dimensioned lock ring 12, the interior contour of which is predetermined because of the required flow cross-sections in the turbo-operation, a reduction of the engine housing 8a can be achieved in comparison to the embodiment in FIGS. 1 and 2. This also has the result that the intermediate housing 6 has a smaller thickness between the turbo-inlet duct 3 and the ram-air inlet duct 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An integrated turboramjet engine comprising:
   a common air inlet for a turbo and a ramjet circuit,
   an annular turbo inlet duct disposed downstream of the common air inlet,
   a ram-air inlet duct disposed downstream of the common air inlet duct and surrounding the turbo inlet duct,
   a guide ring arranged in the common air inlet,
   an inlet cone disposed radially inside the guide ring,
   a lock ring disposed radially outside the guide ring,
   an inlet cone adjusting device for selectively moving the inlet cone between a first ramjet operating position and a second turbojet operating position, and a lock ring adjusting device for selectively moving the lock ring between a first ramjet operating position and a second turbojet operating position, wherein when said inlet cone and lock ring are in their respective first ramjet operating positions, the inlet cone is situated in its front end position and the lock ring is situated in its rear end position so that the inlet cone, guide ring and lock ring form a duct wall which guides the gas flow into the ram-air inlet duct, and wherein when said inlet cone and lock ring are in their respective second turbojet operating positions, the ram-air inlet duct is closed off by the lock ring and the gas flow is guided on both sides of the guide ring into the turbo-inlet duct.

2. A turboramjet engine according to claim 1, wherein the guide ring is supported on an interior housing of the engine by way of radial supporting ribs.

3. A turboramjet engine according to claim 1, wherein the guide ring is configured such that, during the turbo-operation, the relative size of the flow cross-sections inside and outside the guide ring are essentially constant along the guide ring and particularly at its front edge and its rear edge.

4. A turboramjet engine according to claim 1, wherein the guide ring has an aerodynamic profile contour in the axial sectional view.

5. A turboramjet engine according to claim 1, wherein the lock ring is arched toward the outside in its center section.

6. A turboramjet engine according to claim 1, wherein the interior housing of the engine downstream of the inlet cone is extended radially toward the inside.

7. A turboramjet engine according to claim 1, wherein the inlet cone adjusting device includes at least one adjusting arrangement supported on the interior housing of the engine for adjusting the inlet cone.

8. A turboramjet engine according to claim 1, wherein an intermediate housing is provided between the ram-air inlet duct and the turbo-inlet duct, said intermediate housing having a guiding recess in its front end area for the lock ring.

9. A turboramjet engine according to claim 1, wherein the adjusting devices are operable such that the front edge of the lock ring rests in a flow-promoting manner against the area of the rear edge of the guide ring during the ramjet operation and rests against the outer housing of the engine during the turbo-operation.

10. A turboramjet engine according to claim 1, wherein the outer housing of the engine has a square or rectangular cross-section in the moving range of the lock ring.

11. A turboramjet engine according to claim 10, wherein the outer housing of the engine has a square shape and, in a transition area downstream of the rear end position of the lock ring, is formed into a round cross-section, an air guiding shell being mounted on the outer housing of the engine upstream of the lock ring, this air guiding shell having a transition from the square to the round cross-section until it reaches a contact line with the lock ring.

12. A turboramjet engine according to claim 1, wherein the inlet cone inside the interior housing of the engine is preferably guided by way of a cylinder guide.

13. A turboramjet engine according to claim 1, wherein the lock ring adjusting device includes at least one adjusting arrangement housed inside the intermediate housing.

14. A turboramjet engine according to claim 1, wherein housing means are provided for housing all adjusting and guiding arrangements to be protected from the gas flow during the ramjet operation.

15. A turboramjet engine according to claim 3, wherein the interior housing of the engine downstream of the inlet cone is extended radially toward the inside.

16. A turboramjet engine according to claim 5, wherein the interior housing of the engine downstream of the inlet cone is extended radially toward the inside.

17. A turboramjet engine according to claim 3, wherein the inlet cone adjusting device includes at least one adjusting arrangement supported on the interior housing of the engine for adjusting the inlet cone.

18. A turboramjet engine according to claim 16, wherein the inlet cone adjusting device includes at least one adjusting arrangement supported on the interior housing of the engine for adjusting the inlet cone.

19. A turboramjet engine according to claim 16, wherein an intermediate housing is provided between the ram-air inlet duct and the turbo-inlet duct, said intermediate housing having a guiding recess in its front end area for the lock ring.

20. A turboramjet engine according to claim 18, wherein an intermediate housing is provided between the ram-air inlet duct and the turbo-inlet duct, said intermediate housing having a guiding recess in its front end area for the lock ring.

21. A turboramjet engine according to claim 15, wherein the adjusting devices are operable such that the front edge of the lock ring rests in a flow-promoting manner against the area of the rear edge of the guide ring during the ramjet operation and rests against the outer housing of the engine during the turbo-operation.

22. A turboramjet engine according to claim 18, wherein the adjusting devices are operable such that the front edge of the lock ring rests in a flow-promoting manner against the area of the rear edge of the guide ring during the ramjet operation and rests against the outer housing of the engine during the turbo-operation.

23. A turboramjet engine according to claim 20, wherein housing means are provided for housing all adjusting and guiding arrangements to be protected from the gas flow during the ramjet operation.

24. A turboramjet engine according to claim 3, wherein housing means are provided for housing all adjusting and guiding arrangements to be protected from the gas flow during the ramjet operation.

25. A turboramjet engine according to claim 18, wherein housing means are provided for housing all adjusting and guiding arrangements to be protected from the gas flow during the ramjet operation.

* * * * *